US008625672B2

(12) United States Patent
Lai et al.

(10) Patent No.: US 8,625,672 B2
(45) Date of Patent: *Jan. 7, 2014

(54) METHODS AND APPARATUS FOR VIDEO ENCODING AND DECODING USING PARAMETRIC FILTERING

(75) Inventors: PoLin Lai, Los Angeles, CA (US); Purvin Bibhas Pandit, Fraklin Park, NJ (US); Peng Yin, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 320 days.

This patent is subject to a terminal disclaimer.

(21) Appl. No.: 12/735,331

(22) PCT Filed: Jan. 5, 2009

(86) PCT No.: PCT/US2009/000027
§ 371 (c)(1),
(2), (4) Date: Jul. 2, 2010

(87) PCT Pub. No.: WO2009/088976
PCT Pub. Date: Jul. 16, 2009

(65) Prior Publication Data
US 2010/0278267 A1 Nov. 4, 2010

Related U.S. Application Data

(60) Provisional application No. 60/019,525, filed on Jan. 7, 2008.

(51) Int. Cl.
*H04B 1/66* (2006.01)
(52) U.S. Cl.
USPC ............ 375/240.16; 375/240.12; 375/240.15; 375/240.14; 375/240.24; 375/240.25; 382/238; 382/236; 382/233; 382/235

(58) Field of Classification Search
USPC ............ 375/240.16, 240.12, 240.15, 240.14, 375/240.24, 240.25; 382/238, 236, 233, 382/235
See application file for complete search history.

(56) References Cited

U.S. PATENT DOCUMENTS 6,285,711 B1 * 9/2001 Ratakonda et al. ...... 375/240.16
6,735,253 B1 * 5/2004 Chang et al. ............ 375/240.16
(Continued)

FOREIGN PATENT DOCUMENTS

EP 1841230 10/2007
JP 07-240924 A 9/1995
(Continued)

OTHER PUBLICATIONS

Kim et al.:"New Coding Tools for Illumination and Focus Mismatch Compensation in Multiview Video Coding," IEEE Transactions on Circuits and Systems for Video Technology, vol. 17, No. 11, Nov. 2007, pp. 1519-1535.

(Continued)

*Primary Examiner* — Shawn An
(74) *Attorney, Agent, or Firm* — Robert D. Shedd; Ronald J. Kolczynski (57) ABSTRACT

There are provided methods and apparatus for video coding. Using the method, a video encoder (100) performs filtering of at least one reference picture to obtain at least one filtered reference picture (310), and predictively codes the picture using the at least one filtered reference picture (315). In an exemplary embodiment, the filtering is done using parametric filtering.

2 Claims, 4 Drawing Sheets

(56) References Cited

U.S. PATENT DOCUMENTS

| | | | |
|---|---|---|---|
| 6,748,020 B1* | 6/2004 | Eifrig et al. | 375/240.26 |
| 7,227,896 B2* | 6/2007 | Sun | 375/240.16 |
| 7,372,905 B2* | 5/2008 | Foo et al. | 375/240.18 |
| 8,094,711 B2* | 1/2012 | Tourapis et al. | 375/240.01 |
| 2005/0207496 A1* | 9/2005 | Komiya et al. | 375/240.16 |
| 2006/0291557 A1 | 12/2006 | Tourapis | |
| 2007/0091997 A1 | 4/2007 | Fogg et al. | |
| 2007/0109409 A1 | 5/2007 | Yea et al. | |
| 2009/0043762 A1* | 2/2009 | Shiverick et al. | 707/5 |
| 2009/0129465 A1* | 5/2009 | Lai et al. | 375/240.02 |
| 2009/0196342 A1* | 8/2009 | Divorra Escoda et al. | 375/240.02 |
| 2009/0290637 A1* | 11/2009 | Lai et al. | 375/240.02 |

FOREIGN PATENT DOCUMENTS

| | | |
|---|---|---|
| JP | 2007-506361 A | 3/2007 |
| JP | 2007-166381 A | 6/2007 |
| WO | WO2008010929 | 1/2008 |

OTHER PUBLICATIONS

Hong et al.:"A Reduced Complexity Loop Filter Using Coded Block Pattern and Quantization Step Size for H.26L Video Coder," Soongsil University, School of Electronic Engineering, IEEE, WPM P-1.09, 2001, pp. 170-171.

Lai et al.:"Focus Mismatches in Multiview Systems and Efficient Adaptive Reference Filtering for Multiview Video Coding", Dec. 2007.

Lai et al.:"Adaptive Filtering for Video Coding with Focus Change," ICASSP, 2007, pp. I-661-I-664.

Budagavi:"Video Compression using Blur Compensation," DSP Solutions R&D Center, Texas Instrument Inc., IEEE, 2005.

Lai et al.:"Adaptive Reference Filtering for MVC," Joint Video Team (JVT) of ISO/IEC MPEG & ITU-T VCEG, Do. JVT-W065, Apr. 21, 2007, p. 1-11.

Fehn et al.:"Study of some MPEG Tools Related to 3D-Video," Heinrich-Hertz-Institute (HHI), ISO/IEC JTC1/SC29/WG11 MPEF02/M8423, May 2002.

International Search Report dated May 26, 2009.

* cited by examiner

METHODS AND APPARATUS FOR VIDEO ENCODING AND DECODING USING PARAMETRIC FILTERING

CROSS-REFERENCE TO RELATED APPLICATIONS

This application claims the benefit, under 35 U.S.C. §365 of International Application PCT/US2009/000027, filed Jan. 5, 2009, which was published in accordance with PCT Article 21(2) on Jul. 16, 2009 in English and which claims the benefit of U.S. provisional patent application No. 61/019,525, filed Jan. 7, 2008.

TECHNICAL FIELD

The present principles relate generally to video encoding and decoding and, more particularly, to methods and apparatus for video coding using parametric filtering.

BACKGROUND

In state of the art video coding schemes, block-based motion compensated prediction (MCP) is used to exploit temporal redundancy. For inter-view coding in a multi-view video coding (MVC) scenario, a block matching procedure can also be applied to perform disparity compensated prediction (DCP), thus exploiting inter-view redundancy. Multi-view video coding (MVC) is the compression framework for the encoding of multi-view sequences. A multi-view video coding (MVC) sequence is a set of two or more video sequences that capture the same scene from a different viewpoint.

However, there exist mismatches in the video content that are beyond translational displacement, such as focus changes, motion blur in monoscopic video, and illumination and/or focus mismatches across different views in multi-view video coding. Furthermore, the exhibited mismatches may be localized such that different portions of a video frame can undergo different types of change with respect to the corresponding areas in one or more frames used as reference. For example, with heterogeneous camera settings among cameras (utilized in multi-view video coding), different types of blurriness/sharpness mismatches will be associated to objects with different depths. As for motion blur in monoscopic video, objects moving in different directions could result in directional blurring. These non-translational mismatches will lower the coding efficiency of motion compensated prediction/disparity compensated prediction.

Without prior information about the mismatch in the video content, a two-pass encoding scheme can be utilized, in which an initial search and filter estimation are performed first to adaptively design filters based on the differences between the current frame and the reference frame(s). Higher coding efficiency is achieved by the preceding described two-pass encoding scheme as new references are created using the estimated filters. However, such scheme significantly increases encoding complexity and also increases the overhead since we transmit filter coefficients for every frame encoded with this scheme.

In the context of video coding, reference frame filtering approaches have been proposed, in which new reference frames are generated to improve coding efficiency.

For focus changes and/or camera panning, a technique referred to as blur compensation was proposed, in which a fixed set of blurring (lowpass) filters are used to generate blurred reference frames for video coding. This technique has two shortcomings for the scenarios we consider. First, the filter selection is made only at the frame-level, i.e., applying different filters to different parts of a frame was not considered. Second, this method relies on a very limited pre-defined filter set (lowpass only).

To more efficiently capture the actual mismatch in the video content, we have previously proposed an adaptive reference filtering approach, which is a two-pass encoding scheme. For example, to encode a frame with inter-view prediction, it was proposed to first perform an initial disparity estimation. By exploiting the disparity fields as an estimation of scene depth, video frames are partitioned into regions which correspond to different scene-depth levels. For each depth level, a spatial filter is adaptively designed based on the difference between the current frame and the reference frame to minimize the residue energy. Such a design approach is able to address depth-dependent focus mismatches exhibited across different views. The estimated filters are applied to the reference frame to create filtered references. For each block, the encoder selects the predictor (filtered or unfiltered) that provides the lowest rate-distortion cost (RD-cost), thus ensuring the highest coding efficiency. In this adaptive reference filtering (ARF) method, the overhead (frame-wise filter coefficients) will be larger as compared to fixed filter set approaches. More importantly, this two-pass method significantly increases encoding complexity. The additional steps (initial search and filter estimation) are necessary if we do not have prior knowledge about the mismatch.

SUMMARY

These and other drawbacks and disadvantages of the prior art are addressed by the principles of the present invention—directed to methods and apparatus for video encoding and decoding.

According to an aspect of the present principles, there is provided an apparatus. The apparatus includes an encoder for encoding a picture. The encoder performs filtering of at least one reference picture to obtain at least one filtered reference picture, and predictively codes the picture using the at least one filtered reference picture.

According to another aspect of the present principles, there is provided a method. The method includes encoding a picture. The encoding step includes performing filtering of at least one reference picture to obtain at least one filtered reference picture, and predictively coding the picture using the at least one filtered reference picture.

According to yet another aspect of the present principles, there is provided an apparatus. The apparatus includes a decoder for decoding a picture. The decoder performs filtering of at least one reference picture to obtain at least one filtered reference picture, and predictively decodes the picture using the at least one filtered reference picture.

According to still another aspect of the present principles, there is provided a method. The method includes decoding a picture. The decoding step includes performing filtering of at least one reference picture to obtain at least one filtered reference picture, and predictively decoding the picture using the at least one filtered reference picture.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to methods and apparatus for video coding using parametric filtering.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, as interchangeably used herein, "cross-view" and "inter-view" both refer to pictures that belong to a view other than a current view.

It is to be appreciated that while one or more embodiments of the present principles are described herein with respect to the multi-view video coding extension of the MPEG-4 AVC standard, the present principles are not limited to solely this extension and/or this standard and, thus, may be utilized with respect to other video coding standards, recommendations, and extensions thereof, while maintaining the spirit of the present principles.

Figure 1:
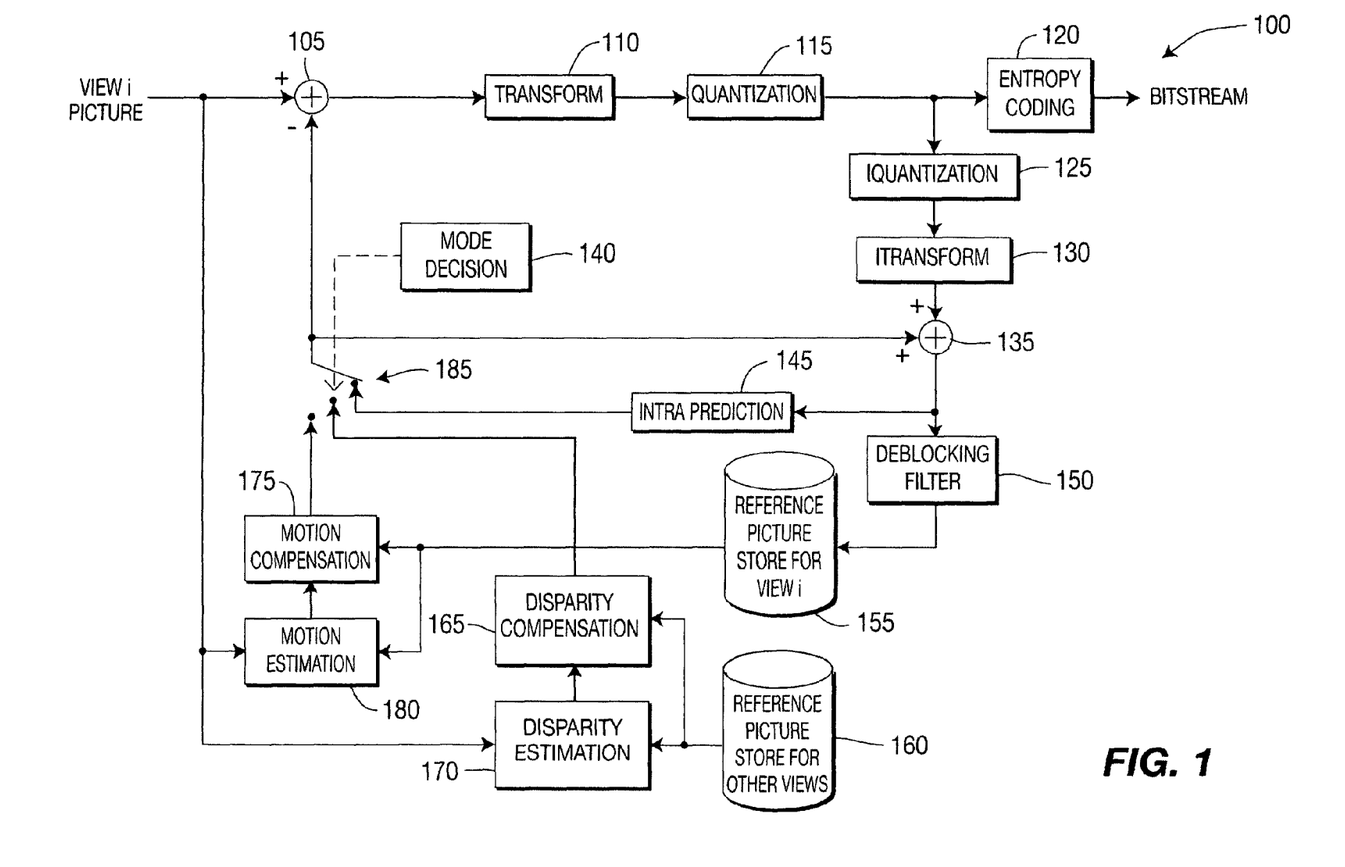
FIG. 1 is a block diagram for an exemplary Multi-view Video Coding (MVC) encoder to which the present principles may be applied, in accordance with an embodiment of the present principles.

Turning to FIG. 1, an exemplary Multi-view Video Coding (MVC) encoder is indicated generally by the reference numeral 100. The encoder 100 includes a combiner 105 having an output connected in signal communication with an input of a transformer 110. An output of the transformer 110 is connected in signal communication with an input of quantizer 115. An output of the quantizer 115 is connected in signal communication with an input of an entropy coder 120 and an input of an inverse quantizer 125. An output of the inverse quantizer 125 is connected in signal communication with an input of an inverse transformer 130. An output of the inverse transformer 130 is connected in signal communication with a first non-inverting input of a combiner 135. An output of the combiner 135 is connected in signal communication with an input of an intra predictor 145 and an input of a deblocking filter 150. An output of the deblocking filter 150 is connected in signal communication with an input of a reference picture store 155 (for view i). An output of the reference picture store 155 is connected in signal communication with a first input of a motion compensator 175 and a first input of a motion estimator 180. An output of the motion estimator 180 is connected in signal communication with a second input of the motion compensator 175

An output of a reference picture store 160 (for other views) is connected in signal communication with a first input of a disparity/illumination estimator 170 and a first input of a disparity/illumination compensator 165. An output of the disparity/illumination estimator 170 is connected in signal communication with a second input of the disparity/illumination compensator 165.

An output of the entropy decoder 120 is available as an output of the encoder 100. A non-inverting input of the combiner 105 is available as an input of the encoder 100, and is connected in signal communication with a second input of the disparity/illumination estimator 170, and a second input of the motion estimator 180. An output of a switch 185 is connected in signal communication with a second non-inverting input of the combiner 135 and with an inverting input of the combiner 105. The switch 185 includes a first input connected in signal communication with an output of the motion compensator 175, a second input connected in signal communication with an output of the disparity/illumination compensator 165, and a third input connected in signal communication with an output of the intra predictor 145.

A mode decision module 140 has an output connected to the switch 185 for controlling which input is selected by the switch 185.

Figure 2:
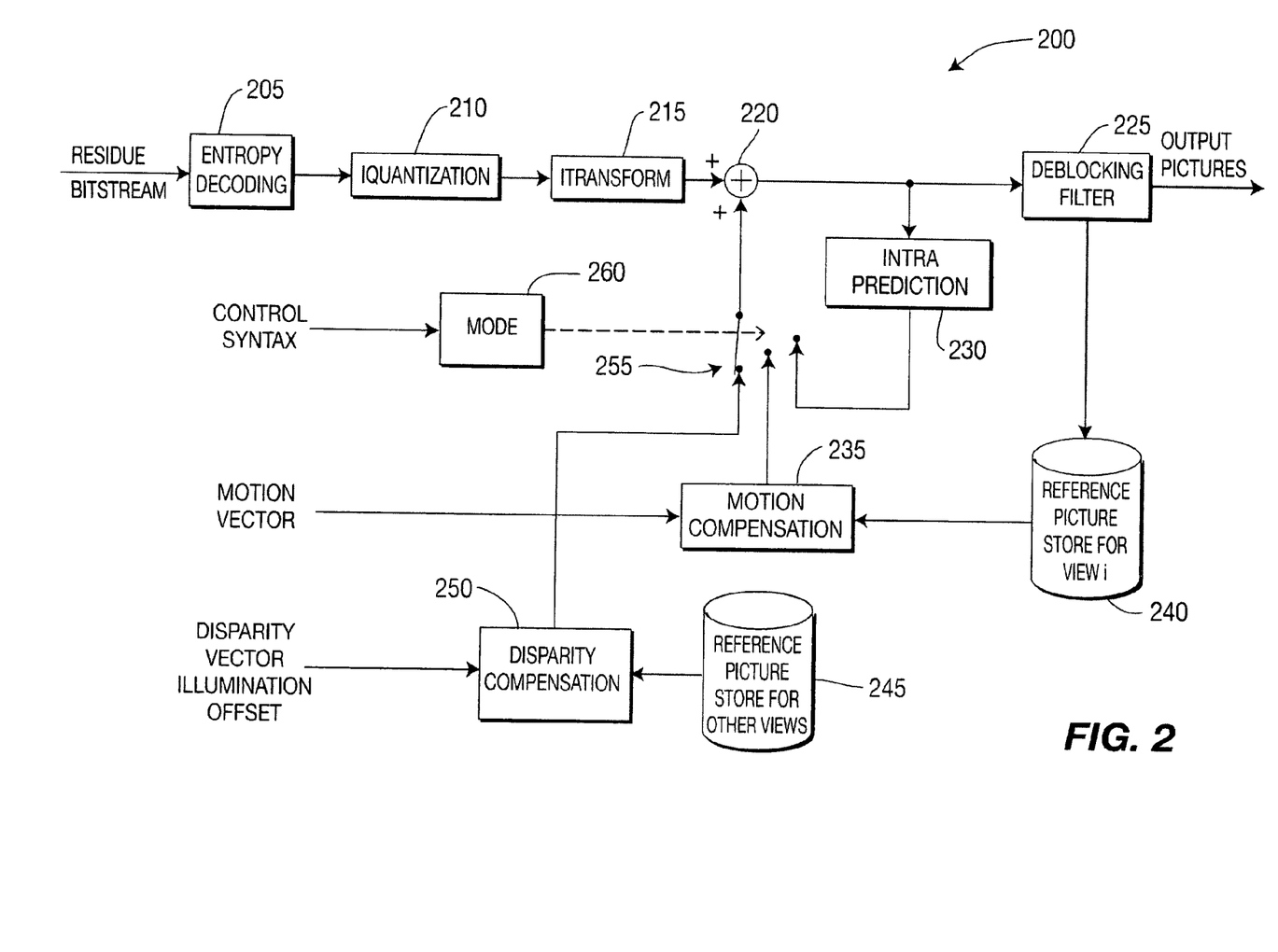
FIG. 2 is a block diagram for an exemplary Multi-view Video Coding (MVC) decoder to which the present principles may be applied, in accordance with an embodiment of the present principles.

Turning to FIG. 2, an exemplary Multi-view Video Coding (MVC) decoder is indicated generally by the reference numeral 200. The decoder 200 includes an entropy decoder 205 having an output connected in signal communication with an input of an inverse quantizer 210. An output of the inverse quantizer is connected in signal communication with an input of an inverse transformer 215. An output of the inverse transformer 215 is connected in signal communication with a first non-inverting input of a combiner 220. An output of the combiner 220 is connected in signal communication with an input of a deblocking filter 225 and an input of an intra predictor 230. An output of the deblocking filter 225 is connected in signal communication with an input of a reference picture store 240 (for view i). An output of the reference picture store 240 is connected in signal communication with a first input of a motion compensator 235.

An output of a reference picture store 245 (for other views) is connected in signal communication with a first input of a disparity/illumination compensator 250.

An input of the entropy coder 205 is available as an input to the decoder 200, for receiving a residue bitstream. Moreover, an input of a mode module 260 is also available as an input to the decoder 200, for receiving control syntax to control which input is selected by the switch 255. Further, a second input of the motion compensator 235 is available as an input of the decoder 200, for receiving motion vectors. Also, a second input of the disparity/illumination compensator 250 is available as an input to the decoder 200, for receiving disparity vectors and illumination compensation syntax.

An output of a switch 255 is connected in signal communication with a second non-inverting input of the combiner 220. A first input of the switch 255 is connected in signal communication with an output of the disparity/illumination compensator 250. A second input of the switch 255 is connected in signal communication with an output of the motion compensator 235. A third input of the switch 255 is connected in signal communication with an output of the intra predictor 230. An output of the mode module 260 is connected in signal communication with the switch 255 for controlling which input is selected by the switch 255. An output of the deblocking filter 225 is available as an output of the decoder.

As noted above, the present principles are directed to methods and apparatus for video coding using parametric filtering.

In contrast to the above described prior art technique of blur compensation which relies upon a very limited pre-defined filter set (lowpass only), in accordance with the present principles, we provide pre-defined filter sets that are designed based on the characteristics of the mismatch to be compensated. Possible examples of such mismatches are focus mismatch in inter-view prediction for multi-view video coding (MVC) and directional motion blur in monoscopic video. Thus, in an embodiment, we can include high-frequency enhancement filters to compensate for focus mismatch, and in another or the same embodiment, we can include directional filters to compensate for motion blur. Multiple parametric filters can be supported in our approach such that localized compensation can be applied. It is to be appreciated that the preceding types of mismatches (focus mismatch and motion blur) are mentioned for the purpose of illustration and, thus, the present principles are not limited to solely those types of mismatches. That is, given the teachings of the present principles provided herein, one of ordinary skill in this and related arts will readily appreciate the various types of mismatches to which the present principles may be applied, while maintaining the spirit of the present principles.

Thus, parametric filtering for video coding in accordance with the present principles advantageously exploits the characteristics of the mismatch. In an embodiment, a set of parametric filters are designed before encoding the video sequence (pre-defined filter set). These parametric filters are designed based on the knowledge of the target mismatch to be compensated for, such as isotropic filters for focus change and directional filters for motion blur. Hence, embodiments of the present principles are capable of providing application specific pre-defined filter sets. Multiple parametric filters can be designed in order to compensate for localized mismatches. In the presence of the targeted mismatch, new reference frames can be generated by applying the parametric filters to improve coding efficiency. Note that although the parametric filters are designed beforehand, the decision of whether to use them, which filter(s) to be used, and the ordering of the filters for generating new reference frames, can be adaptively determined based on estimations of the mismatch. Thus, embodiments of the present principles can reduce complexity as compared to other methods that also utilize reference filtering (which estimate filters with an initial search for each frame to be encoded), while still efficiently capturing the mismatches exhibited in the video content. Moreover, since the filters are parameterized according to the properties of the mismatch and the coding decision can be made adaptive, the coding efficiency is improved. That is, while we keep the overhead very small (pre-defined filter set instead of one filter set for every frame), high coding efficiency can be achieved since the filters are parameterized by exploiting the properties of the mismatch and the selection is adaptive to the estimated difference between video frames.

Thus, in accordance with one or more embodiments of the present principles, we disclose methods and apparatus for designing parametric filters based on the properties of a mismatch, where the parametric filters are applied to video sequences that suffer from the same category of mismatch (such as, for example, focus change, and/or motion blur). The new coding scheme avoids performing two-pass coding as in adaptive reference filtering (ARF), while the parametric filters to be utilized can still be designed/selected according the difference between the current frame and a reference frame(s). For example, we can fix the structure of the filter, and the filter parameters can be adjusted, so that the filter can be changed to a lowpass, bandpass and/or highpass filter accordingly. Multiple parametric filters can be constructed to compensate for localized and/or different types of mismatch within a frame. After designing the set of filters, the filters are made available to the encoder such that the encoder can use them to generate new filtered reference frames for higher coding efficiency (application specific pre-defined filter set).

Parametric Filtering for Focus Mismatch in MVC Inter-View Prediction

In multi-view video coding, video data captured simultaneously by multiple cameras is encoded. We refer to the respective video from the different cameras as views. Inter-view prediction refers to encoding a frame using frames from other views as references. Frames from different views may exhibit focus mismatch, due to heterogeneous camera settings and/or different shooting positions/orientations. It has been shown that the differences exhibited in images captured by different cameras can be represented in terms of the focus setting mismatches and the depths of objects. The mismatches lead to differences in optical transfer functions which can be represented as blurring (lowpass)/sharpening (enhancement) filters that are circular symmetric in the spatial domain. For a given pair of views, the type (lowpass, enhancement, and so forth) and degree of change are associated with the depth composition within the scene. Parametric filters can be constructed to cover a wide range of such focus mismatches. Some examples are summarized below in the following tables. TABLES 1A and 1B show parametric filters with 3×3 and 5×5 symmetric constraints, respectively. TABLES 2A and 2B show parametric filters with 3×3 and 5×5 vertical/horizontal symmetric constraints, respectively.

TABLE 1A

| c | b | c |
| b | a | b |
| c | b | c |

TABLE 1B

| f | e | d | e | f |
| e | c | b | c | e |
| d | b | a | b | d |
| e | c | b | c | e |
| f | e | d | e | f |

TABLE 2A

| d | b | d |
| c | a | c |
| d | b | d |

TABLE 2B

| i | g | e | g | i |
| h | d | b | d | h |
| g | c | a | c | f |
| h | d | b | d | h |
| i | g | e | g | i |

Note that diamond-shaped parametric filters can be considered as a special case of the above filters. For example, if we force g=h=i=0 in the 5×5 vertical/horizontal filter, we obtain the following diamond-shape as shown in TABLE 3:

TABLE 3

|   |   | e |   |   |
|   | d | b | d |   |
| f | c | a | c | f |
|   | d | b | d |   |
|   |   | e |   |   |

By varying the values of the parameters (filter coefficients), we can generate filters with different frequency responses to compensate for possible focus mismatch in inter-view prediction. In one embodiment, we construct a set of filters by estimating and collecting parametric filters that minimize the prediction error for sequences with focus mismatches, and classify/cluster the collected parametric filters into some representative filters. Then, the obtained filter set can serve as the parametric filters that are used to compensate for focus mismatch in multi-view video coding inter-view prediction. In another embodiment, we fix the structure of a set of the parametric filters and estimate the parameters for each parametric filter on the fly.

The pre-defined filter set provides encoder options when coding multi-view video. Depending on the focus setting difference and the depth composition of the scene, the image will exhibit different types of focus mismatch. Thus, it is not necessary for a multi-view video coded view to utilize all the parametric filters. The following provide some examples of when all of the parametric filters need not be used:

(1) If a view does not have focus mismatch as compared to the view(s) used for reference, the filtering approach is not necessary while coding efficiency can be preserved.

(2) When only certain types of focus mismatch are present in the view being encoded, some parametric filters may be very rarely selected by block-based compensation as they cannot provide coding improvement. Eliminating these parametric filters from the filter list can help save the bitrate spent on signaling the reference index, as we will have fewer filtered references to choose from.

(3) Even if there are similar types of mismatch, the composition of the mismatch in the scene can still be different. For example, one scene may have objects mostly requiring enhancement where only a few of the objects need lowpass filtering, while in another scene a larger portion may need to be smoothed (lowpass filtering). The ordering of the parametric filters should be altered accordingly. Putting the most dominant mismatch filter first in the list can further reduce the signaling bitrate.

To take these into account and improve the coding efficiency, in accordance with one or more embodiment, we also propose estimation techniques to adaptively determine, for each view, which parametric filters are to be included and the ordering of the included filters.

Focus Mismatch Estimation

Embodiment I

If the camera parameters (such as, for example, focus setting and aperture size) are available, the characteristics of the imaging system (i.e., the optical transfer functions) can be derived. When the depth information is also available (for example, in free viewpoint television systems), combined with the optical transfer functions, we will be able to know what kinds of mismatch will be present in the images. For a given view, we select from the pre-defined filter set the parametric filters which cover the types of mismatch that will be exhibited in the images based on the above information. The depth information also tells us the depth composition of the scene and consequently tells us what type of mismatch is more dominant. Thus, the ordering of the selected filters can be determined accordingly.

Focus Mismatch Estimation

Embodiment II

When the camera parameters are available (and, thus, the optical transfer functions are known) but not depth information (i.e., no depth information is currently available for use), we can perform an estimation to approximately calculate the depth. For example, if we also know the spacing between cameras and the relative shooting orientation, the estimated disparity can then be used to trace back the actual depth of different objects in the scene. That is to say, given the multi-view camera parameters, we can perform disparity estimation (via search, for example) to identify possible types of focus mismatch. For a given view, after such estimation, we select from the pre-defined filter set the parametric filters which cover the types of mismatch we are considering. The disparity estimation also indicates the depth composition of the scene and consequently what type of mismatch is more dominant. The ordering of the selected filters can be determined accordingly.

Focus Mismatch Estimation

Embodiment III

When the multi-view camera parameters are not fully available, we can use the procedure similar to adaptive reference filtering to estimate the mismatch in the images. For a given view to be encoded, frames are partitioned into different depth-levels based on classification of the disparity vectors. Then, two-dimensional (2D) minimum mean-squared error filters are estimated for all the blocks in each depth level. These estimated filters indicate what the types of focus mismatch are in the current view as compared to the reference view(s). We can then compare the estimated filters with the parametric filters in the pre-defined set. Filters in the pre-defined set which have the highest correlations to the estimated filters are selected to serve as additional coding options for the current view, in order to generate new reference frames. The ordering of the selected parametric filters can also be decided based on the classification and correlation analysis.

It is to be noted that in various embodiments of these methods, the disparity estimation (embodiments II and III) and filter estimation (embodiment III) can be performed in some early frames of a given view and, then the selected parametric filters are applied to the remaining frames. In other embodiments, the estimations can be carried out at certain particular timestamps (for example, every 10th frame) and the chosen parametric filters are applied to frames between the mismatch-estimation timestamps.

Parametric Filtering for Directional Motion Blur in Video Coding

We now describe the idea of applying parametric filtering to directional motion blur. Parametric filters can be constructed to compensate for motion blur. Since motion can occur in different directions in the video content, the filters can be parameterized with directionality as illustrated below:

TABLE 4

| f | e | d | e | f |   |   |   |   | f | c | f |
| c | b | a | b | c |   |   |   | e |   | b | e |
| f | e | d | e | f |   |   | d | a | d |   |   |
|   |   |   |   |   | e | b | e |   |   |   |   |
|   |   |   |   | f | c | f |   |   |   |   |   |

After constructing a set of filters, the encoder can select which of them to use as well as the filter ordering by performing estimations of the motion blur mismatches. In an embodiment, estimations of the motion blur mismatches may be performed by motion estimation to identify the possible motion blur directions. In another embodiment, we can apply a process similar to adaptive reference filtering to estimate filters which capture the motion blur exhibited in video frames. Then the filters from the pre-defined set which demonstrate the highest correlation to the estimated filters are selected to generate new reference frames.

Signaling of Parametric Filtering

Since the filter set is pre-defined by exploiting the characteristics of the mismatch, the coefficients only have to be transmitted at most once for the entire sequence. Furthermore, if the pre-defined filter set is built as a dictionary which is common to both the encoder and decoder, we do not have to transmit the filter coefficients.

For the case when they are transmitted once, the order in which they are transmitted can be considered as their default order and in the case when they are a fixed set, the default order can be established for them.

When we wish to use these filters in their default order, there is no additional syntax needed. Once the reference picture list is established, the filters are applied in their default order. If there are N filters in each list but only M<N reference pictures in the reference list, then the first M filters are applied.

Due to the fact that frames may use different numbers of parametric filters (even 0, if the encoder determines not to apply filtering) from the pre-defined and the ordering may be different, it will become necessary for these cases to provide such information to the decoder. Here, we demonstrate an example of multi-view video coding interview-prediction using parametric filtering with respect to the signaling of selected filters.

Presume there are 4 parametric filters in the pre-defined set, and they are denoted as f1~f4 and with the default order of f1, f2, f3, f4. Five views (V0~V4) are encoded using inter-view prediction with an IBPBP structure.

TABLE 5

| View (filter selection) Syntax | V1(B) List_0: f3, f4, f1 List_1: f2 | V2(P) List_0: f3, f1 List_1: — | V3(B) List_0: f2 List_1: f2, f3, 1 | V4(P) List_0: — List_1: — |
|---|---|---|---|---|
| | | Values | | |
| Filter_flag | 1 | 1 | 1 | 0 |
| # of filter | 4 | 2 | 3 | — |
| # of filter in List_0 | 3 | — | 1 | — |
| Filter order | List 0: 3, 4, 0, 1 List 1: 0, 2 | List 0: 3, 0, 1 | List 0: 0, 2 List 1: 0, 2, 3 | — |

In this example, for V1, the decoder will know this B-view was encoded with parametric filtering (filter_flag=1). The flag is transmitted as a high level syntax and may be present in, for example, but not limited to, the PPS, SPS, NAL unit header and/or slice header. One embodiment of this flag is shown in TABLE 6, which shows slice header syntax.

As shown in TABLE 5, for V1 there are three filters for List_0 and one filter for List_1. The filter order indicates that the references in List_0 (a total of four: three filtered and one unfiltered) correspond to a filtered reference by f3, a filtered reference by f4, an unfiltered reference, and a filtered reference by f1, and the only filtered reference in List_1 is generated by f2, which is put after the unfiltered reference in List_1.

In this example, the number of filters in each list is different and, in addition, the ordering of the filters is also changed. In order for the decoder to be aware of this, we propose to transmit an additional syntax along with the reference picture list reordering (RPLR) commands which indicates which filter index to use for the reference picture that is being reordered. TABLE 7 shows reference picture list reordering syntax.

V2 is also encoded with parametric filtering (filter_flag=1) and there are two filtered references by f3, f1. The ordering of the references corresponds to: filtered by f3; unfiltered; and filtered by f1. There is no syntax for the number of filters in List_0 since the bitstream will indicate this view is a P-view and, thus, all filters are for List_0. As for V4, filter_flag=0 indicates that is was encoded without applying parametric filtering.

TABLE 6

| slice_header( ) { | C | Descriptor |
|---|---|---|
|   first_mb_in_slice | 2 | ue(v) |
|   slice_type | 2 | ue(v) |
|   ic_enable | 2 | u(1) |
|   if ( anchor_pic_flag ) { | | |
|     if( slice_type = = P \|\| slice_type = = B ) { | | |
|       for( compIdx = 0; compIdx < 2; compIdx++ ) | | |
|         global_disparity_mb_l0 [ compIdx ] | 2 | se(v) |
|     } | | |
|     if(( slice_type = = B ) { | | |
|       for( compIdx = 0; compIdx < 2; compIdx++ ) | | |
|         global_disparity_mb_l1 [ compIdx ] | 2 | se(v) |
|     } | | |
|     if( slice_type = = P \|\| slice_type = = B ) { | | |
|       filter_flag | 2 | u(1) |
|   } //if anchor picture | | |
|   pic_parameter_set_id | 2 | ue(v) |
|   frame_num | 2 | u(v) |
|   ... | | |
| } | | |

TABLE 7

| ref_pic_list_reordering( ) { | C | Descriptor |
|---|---|---|
|   if( slice_type != I && slice_type != SI ) { | | |
|     ref_pic_list_reordering_flag_l0 | 2 | u(1) |
|     if( ref_pic_list_reordering_flag_l0 ) | | |
|       do { | | |
|         reordering_of_pic_nums_idc | 2 | ue(v) |
|         if( reordering_of_pic_nums_idc = = 0 \|\| | | |
|           reordering_of_pic_nums_idc = = 1 ) | | |
|           abs_diff_pic_num_minus1 | 2 | ue(v) |
|         else if( reordering_of_pic_nums_idc = = 2 ) | | |
|           long_term_pic_num | 2 | ue(v) |
|         else if ( reordering_of_pic_nums_idc = = 4 \|\| | | |
|           reordering_of_pic_nums_idc = = 5) { | | |
|           abs_diff_view_idx_minus1 | 2 | ue(v) |
|           filter_index | 2 | ue(v) |
|         } | | |
|       } while( reordering_of_pic_nums_idc != 3 ) | | |
|   } | | |
|   if( slice_type = = B \|\| slice_type = = EB ) { | | |
|     ref_pic_list_reordering_flag_l1 | 2 | u(1) |
|     if( ref_pic_list_reordering_flag_l1 ) | | |
|       do { | | |
|         reordering_of_pic_nums_idc | 2 | ue(v) |
|         if( reordering_of_pic_nums_idc = = 0 \|\| | | |
|           reordering_of_pic_nums_idc = = 1 ) | | |
|           abs_diff_pic_num_minus1 | 2 | ue(v) |
|         else if( reordering_of_pic_nums_idc = = 2 ) | | |
|           long_term_pic_num | 2 | ue(v) |
|         else if ( reordering_of_pic_nums_idc = = 4 \|\| | | |
|           reordering_of_pic_nums_idc = = 5) | | |
|           abs_diff_view_idx_minus1 | 2 | ue(v) |
|           filter_index | 2 | ue(v) |
|       } while( reordering_of_pic_nums_idc != 3 ) | | |
|   } | | |
| } | | |

Figure 3:
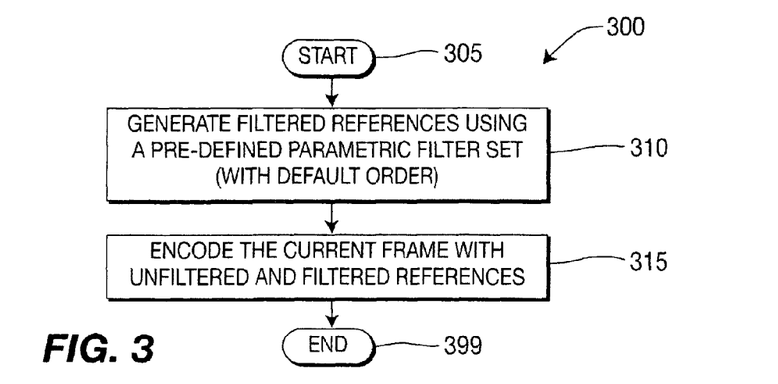
FIG. 3 is a flow diagram for an exemplary method for video encoding using a default parametric filter set, in accordance with an embodiment of the present principles.

Turning to FIG. 3, an exemplary method for video encoding using a default parametric filter set is indicated generally by the reference numeral 300.

The method 300 includes a start block 305 that passes control to a function block 310. The function block 310 generates filtered references using a pre-defined parametric filter set (with a default order), and passes control to a function block 315. The function block 315 encodes the current frame with unfiltered and filtered references, and passes control to an end block 399.

Figure 4:
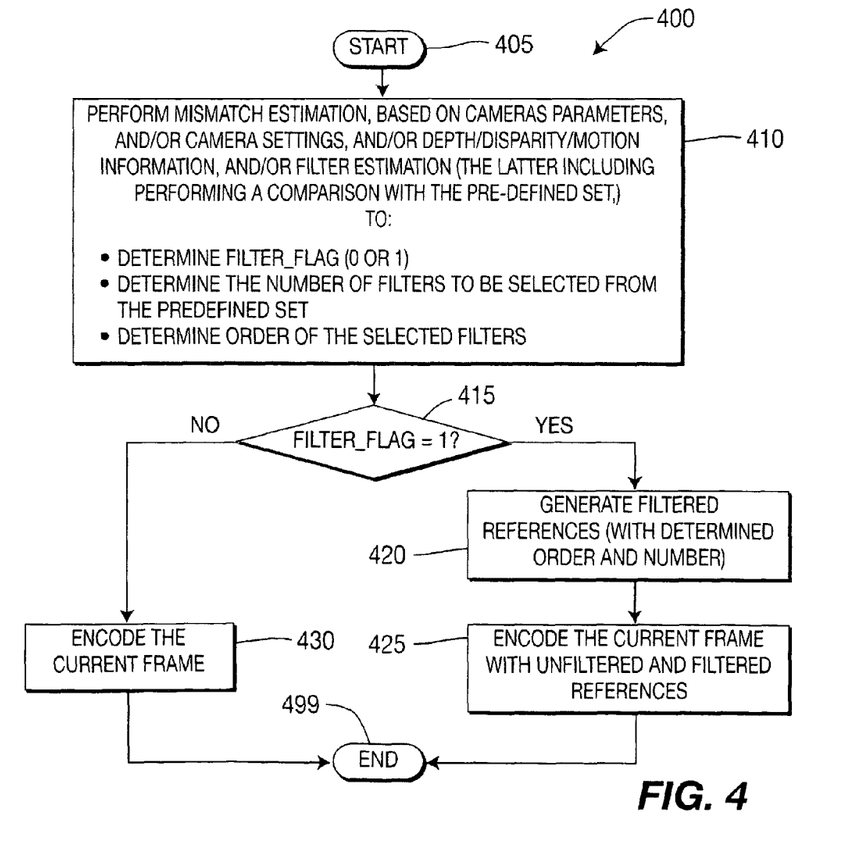
FIG. 4 is a flow diagram for an exemplary method for video encoding using adaptive selection for a parametric filter set, in accordance with an embodiment of the present principles.

Turning to FIG. 4, an exemplary method for video encoding using adaptive selection for a parametric filter set is indicated generally by the reference numeral 400.

The method 400 includes a start block 405 that passes control to a function block 410. The function block 410 performs mismatch estimation, which may be based on cameras parameters, and/or camera settings, and/or depth/disparity/motion information, and/or filter estimation (e.g., the latter including performing a comparison with the pre-defined set), to determine, for example, the value of filter_flag (0 or 1), the number of filters, and the order of the filters, and passes control to a decision block 415. The decision block 415 determines whether or not filter_flag is equal to one. If so, then control is passed to a function block 420. Otherwise, control is passed to a function block 430.

The function block 420 generates filtered references (with the determined order and number (as per function block 410), and passes control to a function block 425. The function block 425 encodes the current frame with unfiltered and filtered references, and passes control to an end block 499.

The function block 430 encodes the current frame, and passes control to the end block 499.

Figure 5:
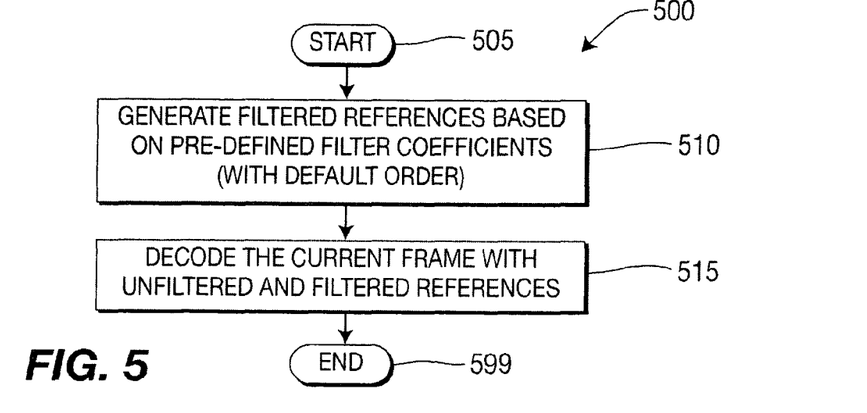
FIG. 5 is a flow diagram for an exemplary method for video decoding using a default parametric filter set, in accordance with an embodiment of the present principles.

Turning to FIG. 5, an exemplary method for video decoding using a default parametric filter set is indicated generally by the reference numeral 500.

The method 500 includes a start block 505 that passes control to a function block 510. The function block 510 generates filtered references based on pre-defined filter coefficients, and passes control to a function block 515. The function block 515 decodes the current frame with the unfiltered and filtered references, and passes control to an end block 599.

Figure 6:
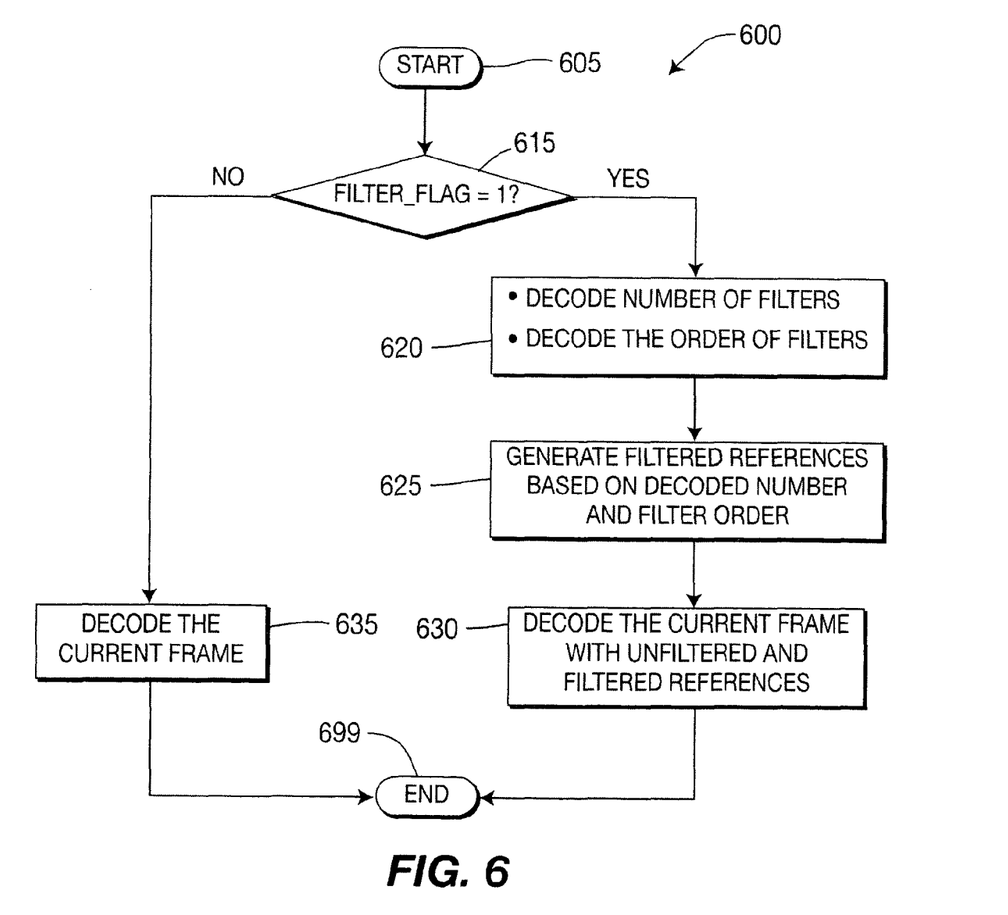
FIG. 6 is a flow diagram for an exemplary method for video decoding using adaptive selection for a parametric filter set, in accordance with an embodiment of the present principles.

Turning to FIG. 6, an exemplary method for video decoding using adaptive selection for a parametric filter set is indicated generally by the reference numeral 600.

The method 600 includes a start block 605 that passes control to a decision block 615. The decision block 615 determines whether or not filter_flag is equal to 1. If so, then control is passed to a function block 620. Otherwise, control is passed to a function block 635.

The function block 620 decodes the number of filters that are selected from the pre-defined filter sets, and also decodes the order of the filters, and passes control to a function block 625. The function block 625 generates filtered references based on the decoded number of filters and the order of the filters, and passes control to a function block 630. The function block 630 decodes the current frame with the filtered and unfiltered references, and passes control to an end block 699.

The function block 635 decodes the current frame, and passes control to the end block 699.

A description will now be given of some of the many attendant advantages/features of the present invention, some of which have been mentioned above. For example, one advantage/feature is an apparatus having an encoder for encoding a picture. The encoder performs parametric filtering of at least one reference picture to respectively obtain at least one filtered reference picture, and predictively codes the picture using the at least one filtered reference picture.

Another advantage/feature is the apparatus having the encoder as described above, wherein at least one set of parametric filters used for the parametric filtering is pre-defined before encoding the picture or a video sequence to which the picture belongs.

Yet another advantage/feature is the apparatus having the encoder where at least one set of parametric filters is pre-defined as described above, wherein the at least one pre-defined set of parametric filters is estimated based on an expected mismatch between the picture and the at least one reference picture.

Still another advantage/feature is the apparatus having the encoder wherein the at least one pre-defined set of parametric filters is estimated as described above, herein coefficients of the at least one pre-defined set of parametric filters are calculated based on estimating a group of filters which compensate for the expected mismatch and classifying at least a portion of the estimated group of filters.

Moreover, another advantage/feature is the apparatus having the encoder where at least one set of parametric filters is pre-defined as described above, wherein the encoder selects at least one set of parametric filters from the at least one pre-defined filter set to use for the parametric filtering, and further selects an ordering of the filters in the at least one selected set.

Further, another advantage/feature is the apparatus having the encoder that selects at least one set of parametric filters and further selects an ordering of the filters as described above, wherein at least one of the at least one selected set of parametric filters and the ordering of the filters in the at least one selected set is selected based on an estimation of a mismatch between the picture and the at least one reference picture.

Also, another advantage/feature is the apparatus having the encoder that selects based on an estimation of a mismatch as described above, wherein the picture corresponds to at least one view of at least two views of multi-view video content, and the estimation is based on at least one of camera parameters and camera settings for at least two cameras used to capture the multi-view video content.

Additionally, another advantage/feature is the apparatus having the encoder that selects based on an estimation of a mismatch as described above, wherein the estimation is based on at least one of motion information, depth information, a motion search, and a disparity search.

Moreover, another advantage/feature is the apparatus having the encoder that selects based on an estimation of a mismatch as described above, wherein the estimation is performed by partitioning the picture into regions with different types of mismatch.

Further, another advantage/feature is the apparatus having the encoder that selects at least one set of parametric filters and further selects an ordering of the filters as described above, wherein the at least one filtered reference picture obtained by performing the parametric filtering is associated with a different reference index for encoding selection and signaling.

Also, another advantage/feature is the apparatus having the encoder that selects at least one set of parametric filters and further selects an ordering of the filters as described above, wherein the encoder signals the at least one selected set of parametric filters and a reference picture ordering in a resultant bitstream to allow a reconstruction of the picture by a corresponding decoder.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding a picture, in which the encoder filters at least one reference picture to obtain at least one filtered reference picture, and predictively encodes the picture using the at least one filtered reference picture wherein at least one set of parametric filters used for the filtering is pre-defined before encoding the picture or a video sequence to which the picture belongs and said pre-defined set is estimated based on an expected mismatch between the picture and the at least one reference picture, and wherein coefficients of the at least one pre-defined set of parametric filters are calculated based on estimating a group of filters which compensate for the expected mismatch and classifying at least a portion of the estimated group of filters.

2. A method for encoding a picture comprising:
filtering at least one reference picture to obtain at least one filtered reference picture;
predictively coding the picture using the at least one filtered reference picture,
wherein at least one set of parametric filters used for the filtering is pre-defined before encoding the picture or a video sequence to which the picture belongs and
wherein the at least one pre-defined set of parametric filters is estimated based on an expected mismatch between the picture and the at least one reference picture, and
wherein coefficients of the at least one pre-defined set of parametric filters are calculated based on estimating a group of filters which compensate for the expected mismatch and classifying at least a portion of the estimated group of filters.

* * * * *